(12) United States Patent
Yamada

(10) Patent No.: US 10,823,851 B2
(45) Date of Patent: Nov. 3, 2020

(54) DEVICE AND METHOD FOR ESTIMATING DEGREE OF FREEDOM FOR MOVEMENT

(71) Applicant: FUJITSU LIMITED, Kawasaki-shi, Kanagawa (JP)

(72) Inventor: Moyuru Yamada, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/240,914

(22) Filed: Jan. 7, 2019

(65) Prior Publication Data

US 2019/0227167 A1    Jul. 25, 2019

(30) Foreign Application Priority Data

Jan. 25, 2018   (JP) ................. 2018-010765

(51) Int. Cl.
| | |
|---|---|
| *G01S 17/06* | (2006.01) |
| *G01S 17/58* | (2006.01) |
| *G06T 7/73* | (2017.01) |
| *G06T 7/579* | (2017.01) |
| *G01S 17/89* | (2020.01) |

(52) U.S. Cl.
CPC ............. *G01S 17/06* (2013.01); *G01S 17/58* (2013.01); *G01S 17/89* (2013.01); *G06T 7/579* (2017.01); *G06T 7/75* (2017.01); *G06T 2207/30241* (2013.01)

(58) Field of Classification Search
CPC .......... G01S 17/06; G01S 17/89; G06T 7/246
See application file for complete search history.

(56) References Cited

U.S. PATENT DOCUMENTS

| 6,141,435 | A | 10/2000 | Naoi et al. | |
|---|---|---|---|---|
| 2006/0034545 | A1* | 2/2006 | Mattes | G06T 7/246 382/294 |
| 2011/0009241 | A1* | 1/2011 | Lane | A63B 24/0087 482/8 |
| 2015/0133820 | A1* | 5/2015 | Zohar | A61B 5/1118 600/595 |

FOREIGN PATENT DOCUMENTS

| JP | 06-337938 | 12/1994 |
|---|---|---|
| JP | 2012-163450 | 8/2012 |
| JP | 2014-228879 | 12/2014 |

* cited by examiner

*Primary Examiner* — Samantha (Yuehan) Wang
(74) *Attorney, Agent, or Firm* — Fujitsu Patent Center

(57) ABSTRACT

A device for estimating a degree of freedom for movement includes a memory, and a processor coupled to the memory and the processor configured to acquire first three-dimensional information of a target object at a first time and second three-dimensional information of the target object at a second time, specify a movable portion of the target object according to a difference between the first three-dimensional information and the second three-dimensional information, estimate the degree of freedom for movement of the movable portion included in the target object according to displacement of the movable portion between the first three-dimensional information and the second three-dimensional information, and assign degree of freedom information for indicating the degree of freedom for movement to a three-dimensional model for representing the target object, based on the estimated degree of freedom for movement of the movable portion.

18 Claims, 13 Drawing Sheets

FIG. 4

| ID | TIME | THREE-DIMENSIONAL INFORMATION |
|---|---|---|
| 1 | t1 | TD1 |
| 2 | t2 | TD2 |
| 3 | t3 | TD3 |
| 4 | t4 | TD4 |
| ... | ... | ... |
| ... | ... | ... |
| n | tn | TDn |

_US 10,823,851 B2_

DEVICE AND METHOD FOR ESTIMATING DEGREE OF FREEDOM FOR MOVEMENT

CROSS-REFERENCE TO RELATED APPLICATION

This application is based upon and claims the benefit of priority of the prior Japanese Patent Application No. 2018-010765, filed on Jan. 25, 2018, the entire contents of which are incorporated herein by reference.

FIELD

The embodiments discussed herein are related to a device and a method for estimating a degree of freedom for movement.

BACKGROUND

A three-dimensional information acquiring device capable of acquiring three-dimensional information of a movable portion having an arbitrary shape has been known in the related art. The three-dimensional information acquiring device utilizes a distance sensor to acquire the movement of a target object including the movable portion as a distance point group of each time in time series. Then, the three-dimensional information acquiring device detects plural planes from the distance point group of each time, sets the detected plural planes as plane groups, compares a plane included in the plane group at a first time with a plane group at a second time, and associates the same planes with each other between times based on a result of the comparison. Then, the three-dimensional information acquiring device selects a first plane and a second surface detected simultaneously with the first plane for a certain period of time, and compares a posture change of the first plane with a posture change of the second plane. Then, as a result of the comparison, when the changes in posture of the first plane and the second plane are the same as each other, the three-dimensional information acquiring device determines that the second plane is a plane constituting the same movable portion as the first surface. When the changes in posture are not the same, the three-dimensional information acquiring device again repeats the processing from the selection of the second plane.

Further, a shape recognizing device for accurately extracting a recognition object is known. The shape recognizing device holds three-dimensional model information indicating a three-dimensional model having an axis, and acquires recognition object information indicating a three-dimensional shape of the recognition object. Then, based on the recognition object information and the three-dimensional model information, the shape recognizing device generates posture candidate information indicating two posture candidates with recognition objects or three-dimensional models symmetrically arranged. Then, based on the posture candidate information and the three-dimensional model information of the recognition object or based on the recognition object information and the posture candidate information of the three-dimensional model, the shape recognizing device identifies the position and posture of the recognition object.

Further, an image processing apparatus capable of analyzing the movements of plural moving objects having different speeds or stationary objects in a short time is known. This image processing apparatus calculates a trajectory of an object from a time-series change in presence/absence of a feature amount.

Related techniques are disclosed in, for example, Japanese Laid-open Patent Publication Nos. 2014-228879, 2012-163450, and 06-337938.

SUMMARY

According to an aspect of the embodiments, a device for estimating a degree of freedom for movement includes a memory, and a processor coupled to the memory and the processor configured to acquire first three-dimensional information of a target object at a first time and second three-dimensional information of the target object at a second time, specify a movable portion of the target object according to a difference between the first three-dimensional information and the second three-dimensional information, estimate the degree of freedom for movement of the movable portion included in the target object according to displacement of the movable portion between the first three-dimensional information and the second three-dimensional information, and assign degree of freedom information for indicating the degree of freedom for movement to a three-dimensional model for representing the target object, based on the estimated degree of freedom for movement of the movable portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a view illustrating an example of a table stored in an information storing unit;

DESCRIPTION OF EMBODIMENTS

In the related art, recognition target information indicating a three-dimensional shape of a recognition target object is acquired. However, no consideration is given to acquiring the degree of freedom of a movable portion of the target object.

Hereinafter, an example of an embodiment of a technique for acquiring information on the degree of freedom of a movable portion of a target object will be described in detail with reference to the accompanying drawings.

First Embodiment

Figure 1:
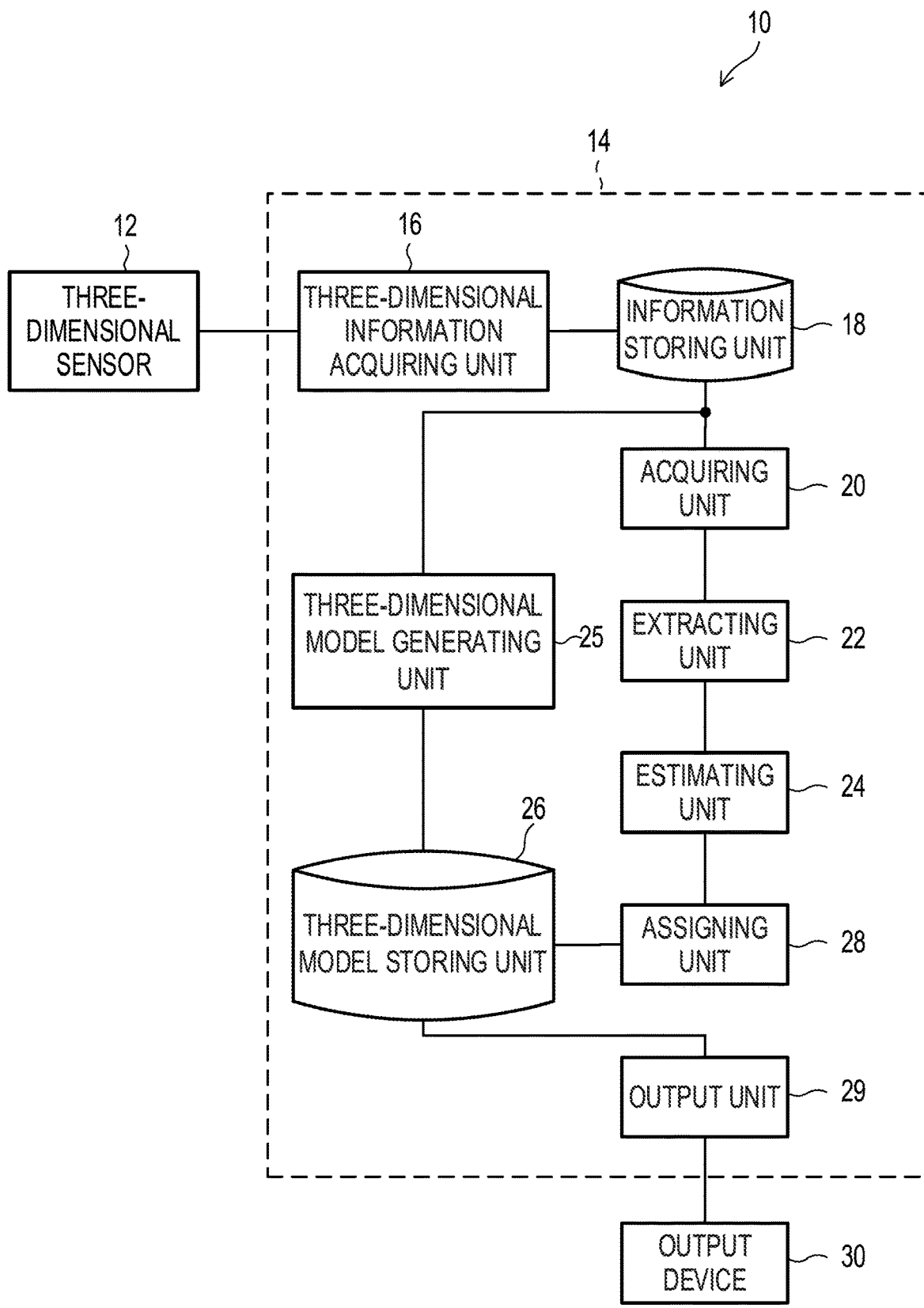
FIG. 1 is a schematic block diagram of a movable degree of freedom estimating system according to an embodiment.

As illustrated in FIG. 1, a movable degree of freedom estimating system 10 according to a first embodiment includes a three-dimensional sensor 12, a movable degree of freedom estimating device 14, and an output device 30.

The three-dimensional sensor 12 sequentially acquires three-dimensional information of a target object. The three-dimensional sensor 12 is implemented by a sensor capable of acquiring three-dimensional shape information of an object, such as a Red-Green-Blue-Depth (RGB-D) sensor, a Light Detection and Ranging (LIDAR) sensor, or a stereo camera.

Figure 2:
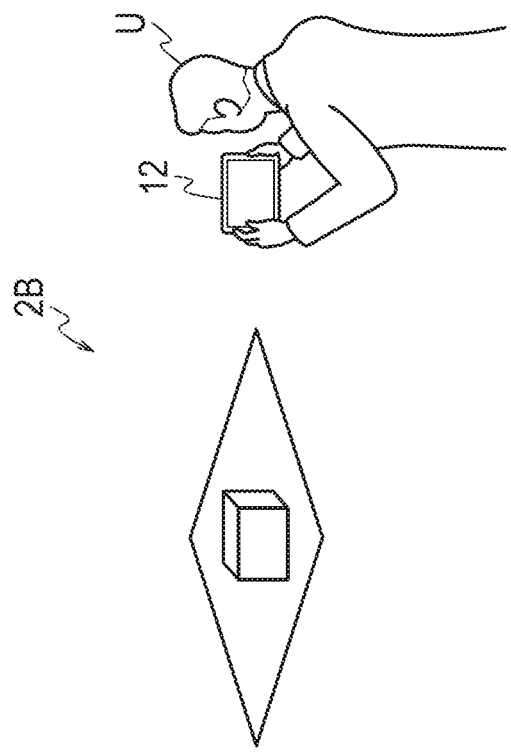
FIG. 2 is an explanatory view for explaining an example of a measurement by a three-dimensional sensor.
Figure 2:
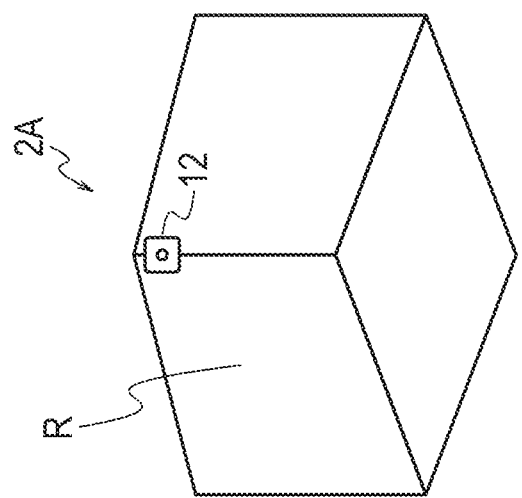

FIG. 2 is an explanatory view for explaining an example of a measurement by the three-dimensional sensor 12. As denoted by reference numeral 2A in FIG. 2, for example, when a three-dimensional sensor 12 is fixed to, for example, the ceiling of a predetermined room R, three-dimensional information of a target object present in the room R is sequentially acquired.

As denoted by reference numeral 2B in FIG. 2, when three-dimensional information is acquired by a hand-held three-dimensional sensor 12, the three-dimensional information may be acquired while a person U having the three-dimensional sensor 12 is moving. Therefore, it is possible to widen a range of acquisition of the three-dimensional information. In addition, a technique for simultaneously performing estimation of a position and generation of a model (e.g., a Simultaneous Localization and Mapping (SLAM) technique) may be used.

As illustrated in FIG. 1, the movable degree of freedom estimating device 14 includes a three-dimensional information acquiring unit 16, an information storing unit 18, an acquiring unit 20, an extracting unit 22, an estimating unit 24, a three-dimensional model generating unit 25, a three-dimensional model storing unit 26, an assigning unit 28, and an output unit 29.

Figure 3:
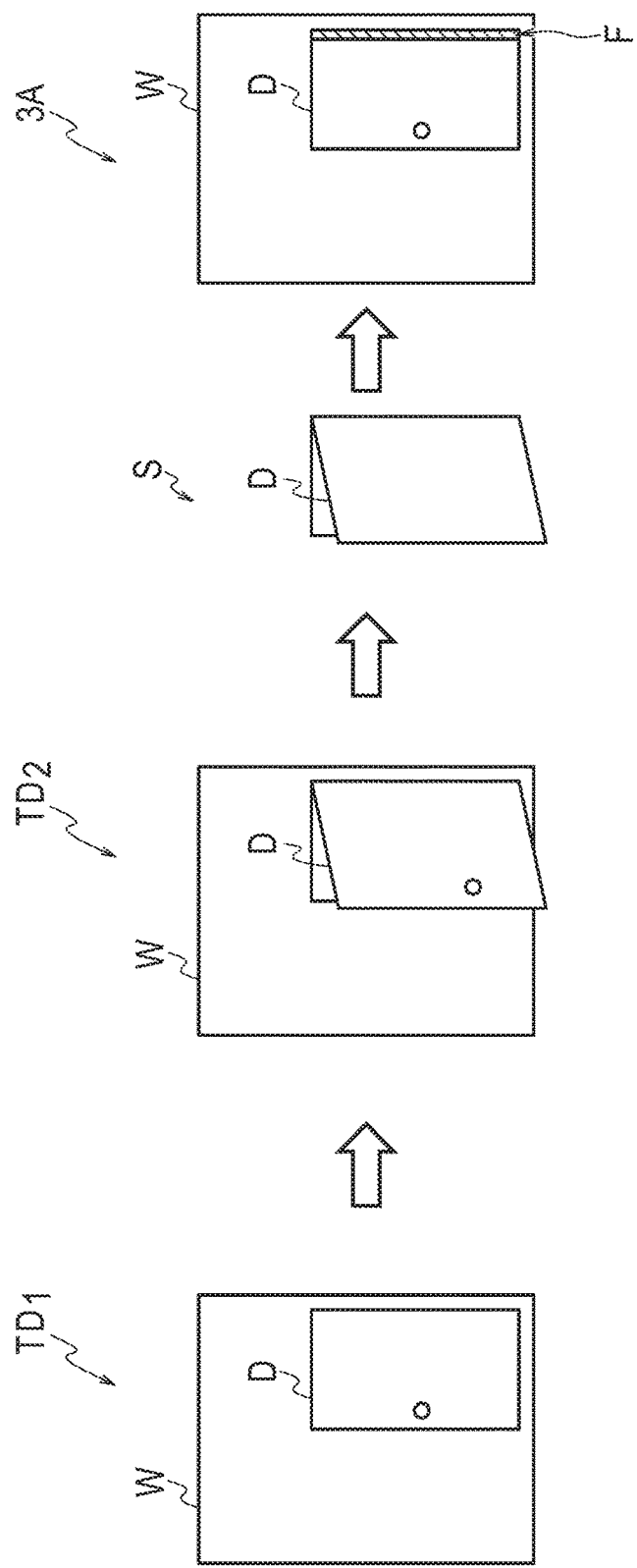
FIG. 3 is an explanatory view for explaining the outline of the embodiment.

FIG. 3 is an explanatory view for explaining the outline of this embodiment. In this embodiment, the degree of freedom of the movable portion of the target object is estimated based on the three-dimensional information acquired by the three-dimensional sensor 12.

For example, as illustrated in FIG. 3, it is assumed that a target object including a door D and a wall W exists and three-dimensional information TD1 is acquired at a specific time t1. Further, as illustrated in FIG. 3, it is assumed that three-dimensional information TD2 is acquired at a time t2 different from the specific time t1.

In this case, difference information S between the three-dimensional information TD1 at the time t1 and the three-dimensional information TD2 at the time t2 is a portion of the door D as illustrated in FIG. 3.

The movable degree of freedom estimating device 14 according to the embodiment estimates a movable portion of the target object and the degree of freedom of the movable portion according to the difference information S. Then, as denoted by reference numeral 3A of FIG. 3, the movable degree of freedom estimating device 14 assigns a degree of freedom F to a three-dimensional model representing the target object. As a result, it is possible to estimate the degree of freedom of the movable portion of the target object from the three-dimensional information of the target object acquired at different times.

The three-dimensional information acquiring unit 16 acquires three-dimensional information of each time acquired by the three-dimensional sensor 12. Then, the three-dimensional information acquiring unit 16 stores the three-dimensional information of each time in the information storing unit 18.

The three-dimensional information of each time acquired by the three-dimensional information acquiring unit 16 is stored in the information storing unit 18. The three-dimensional information of each time of the target object is stored, for example, in the form of a table as illustrated in FIG. 4. An ID representing identification information, a time at which three-dimensional information is acquired, and three-dimensional information corresponding to the time is stored in association with each other in the table illustrated in FIG. 4. For example, the three-dimensional information TD1 obtained at the time t1 is stored as data corresponding to an ID 1 in the table represented in FIG. 4.

Figure 5:
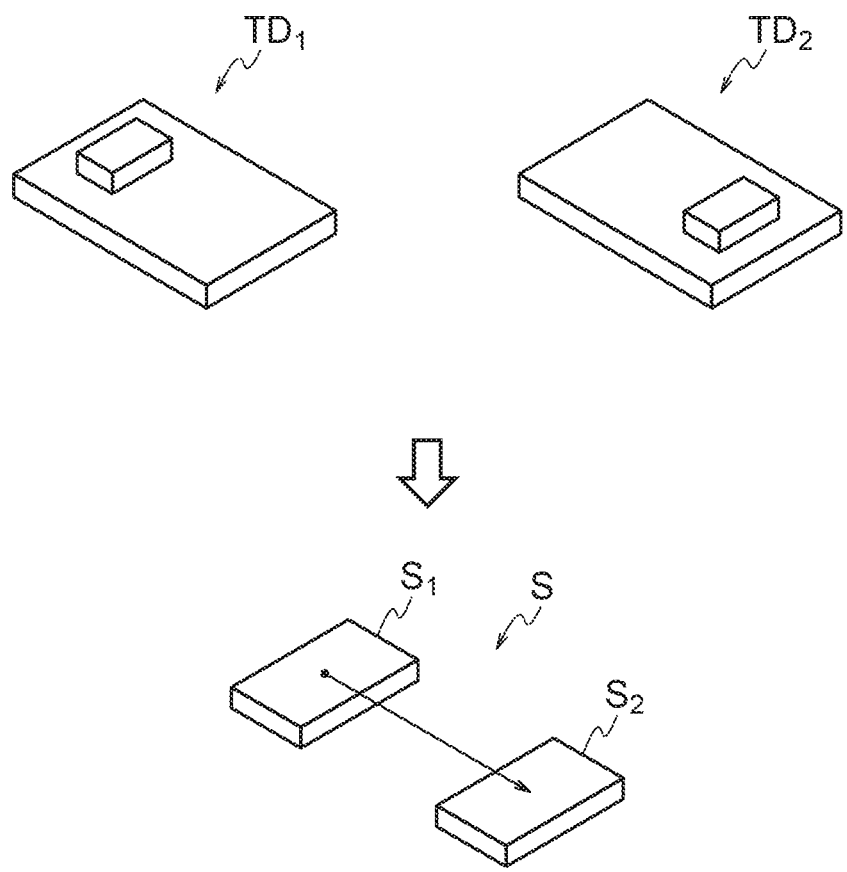
FIG. 5 is an explanatory view for explaining first information, second information, and difference information.

The acquiring unit 20 acquires first information which is three-dimensional information of the target object at a specific time, and second information which is three-dimensional information of the target object at a time different from the specific time, from the information storing unit 18. FIG. 5 is an explanatory view for explaining the first information and the second information. For example, as illustrated in FIG. 5, the acquiring unit 20 acquires the first information TD1 indicating the three-dimensional information acquired at a time t1 and the second information TD2 indicating the three-dimensional information acquired at a time t2.

The extracting unit 22 extracts a movable portion of the target object according to difference information representing a difference between the first information TD1 and the second information TD2 acquired by the acquiring unit 20.

Specifically, first, as illustrated in FIG. 5, the extracting unit 22 extracts difference information S between the first information TD1 and the second information TD2. Then, the extracting unit 22 calculates a similarity between three-dimensional information S1 at a specific time in the difference information S and three-dimensional information S2 at a time different from the specific time in the difference information S.

Figure 6:
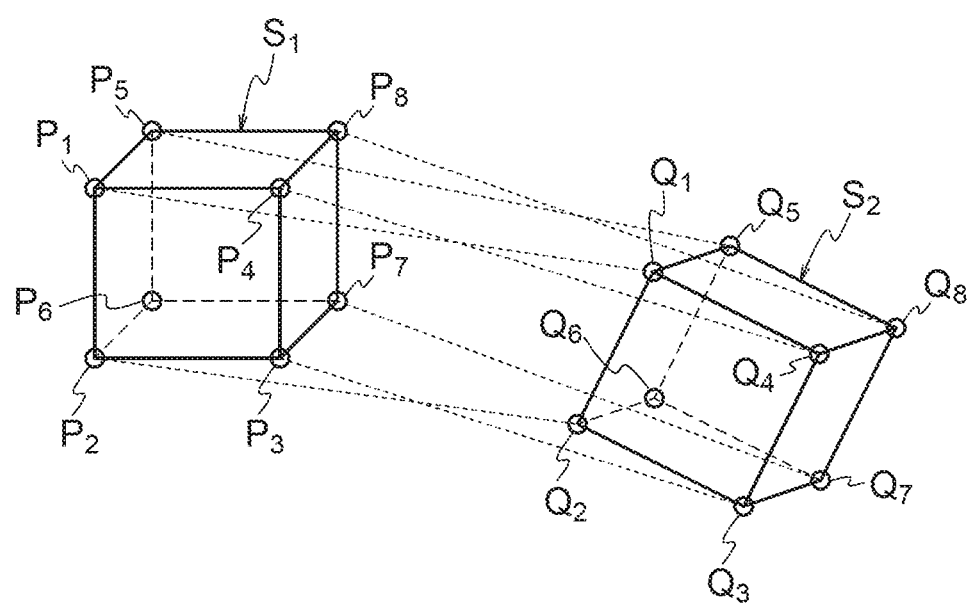
FIG. 6 is an explanatory view for explaining an example of a similarity calculating method.

For example, as illustrated in FIG. 6, the extracting unit 22 calculates the similarity by matching the three-dimensional feature amount of the three-dimensional information S1 at the time t1 with the three-dimensional feature amount of the three-dimensional information S2 at the time t2. For example, the extracting unit 22 calculates the similarity using an average distance error between the corresponding points when plural feature points $P_1$ to $P_8$ at the time t1 and plural feature points $Q_1$ to $Q_8$ at the time t2 match with each other. In this embodiment, the extracting unit 22 calculates the similarity in such a manner that the higher degree of matching between the plural feature points $P_1$ to $P_8$ at the time t1 and the plural feature points $Q_1$ to $Q_8$ at the time t2 provides the higher similarity.

Then, when the similarity is equal to or greater than a preset threshold value, the extracting unit 22 extracts (specifies) the three-dimensional information S1 at the time t1 and the three-dimensional information S2 at the time t2 as the movable portion of the target object.

The estimating unit 24 estimates a displacement and a movable range of the movable portion of the target object between the three-dimensional information TD1 at the time t1 and the three-dimensional information TD2 at the time t2.

Specifically, the estimating unit 24 calculates a homogeneous transformation matrix first based on a change in each three-dimensional point between the three-dimensional information S1 at the time t1 and the three-dimensional information S2 at the time t2 in the difference information S between the three-dimensional information TD1 at the time t1 and the three-dimensional information TD2 at the time t2.

For example, the estimating unit 24 uses the plural feature points $P_1$ to $P_8$ and the plural feature points $Q_1$ to $Q_8$ illustrated in FIG. 6 as target data for each three-dimensional point. In this case, for example, a homogeneous transformation matrix representing translation and rotation is calculated for each of the plural three-dimensional points.

In addition, the estimating unit 24 may calculate a simultaneous transformation matrix so as to minimize an error related to translation and an error related to rotation for all three-dimensional points. In this case, for example, the estimating unit 24 calculates the simultaneous transformation matrix so as to minimize an error occurring when each three-dimensional point at the time t1 is projected so as to overlap each three-dimensional point at the time t2.

Information indicating the translation and information indicating the rotation between the three-dimensional information S1 at the time t1 in the difference information S and the three-dimensional information S2 at the time t2 in the difference information S is stored in each element of the homogeneous transformation matrix. For example, the homogeneous transformation matrix is represented by the following expression (1).

$$\begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix} \quad (1)$$

Where, the part of "$t_x$, $t_y$, $t_z$" in the expression (1) is a translation vector representing the translational movement of the movable portion. The $t_x$ represents the translation amount in the x direction in a coordinate system, the $t_y$ represents the translation amount in the y direction in the coordinate system, and the $t_z$ represents the translation amount in the z direction in the coordinate system. In addition, the part of "$r_{11}, r_{12}, r_{13}, r_{21}, r_{22}, r_{23}, r_{31}, r_{32}, r_{33}$" in the expression (1) is a rotational matrix representing the rotational movement of the movable portion.

The estimating unit 24 calculates a displacement vector representing the displacement of the movable portion from each element of the homogeneous transformation matrix of the expression (1). The displacement vector is represented by, for example, the following expression (2).

$$\begin{bmatrix} r_x \\ r_y \\ r_z \\ t_x \\ t_y \\ t_z \end{bmatrix} \quad (2)$$

The displacement vector represented by the expression (2) includes a rotation vector $[r_x, r_y, r_z]$ representing the rotation of the movable portion and a translation vector $[t_x, t_y, t_z]$ representing the translation of the movable portion. The $r_x$ represents the amount of rotation around the x axis, the $r_y$ represents the amount of rotation around the y axis, and the $r_z$ represents the amount of rotation around the z axis. The transformation from the homogeneous transformation matrix to the displacement vector may be achieved by existing methods.

The estimating unit 24 performs principal component analysis on rotation vectors included in the displacement vectors of the plural three-dimensional points. Further, the estimating unit 24 performs principal component analysis on translation vectors included in the displacement vectors of the plural three-dimensional points. The principal component analysis is used to obtain the minimum degree of freedom to transform from plural three-dimensional points at the time t1 to plural three-dimensional points at the time t2.

For example, as illustrated in FIG. 6, when the plural feature points $P_1$ to $P_8$ of the three-dimensional information S1 at the time t1 move to the plural feature points $Q_1$ to $Q_8$ of the three-dimensional information S2 at the time t2, a translation vector and a rotation vector for this movement are calculated. Therefore, a translation vector and a rotation vector are calculated for each of plural feature points.

The estimating unit 24 performs a principal component analysis on plural translation vectors to acquire a translation vector representing the principal component of the plural translation vectors. In addition, the estimating unit 24 performs principal component analysis on plural rotation vectors to acquire a rotation vector representing the principal component of the plural rotation vectors. Specifically, principal component analysis on rotation of plural feature points is performed to calculate a vector that best represents the rotation of the plural feature points. In addition, principal component analysis on translation of plural feature points is performed to calculate a vector that best represents the translation of the plural feature points.

Next, the estimating unit 24 estimates the degree of freedom for movement of the movable portion included in the target object according to the translation vector and the rotation vector obtained by the principal component analysis. The degree of freedom in the present embodiment is information indicating whether or not the movable portion of the target object is movable around each axis in each axis direction.

Specifically, the estimating unit 24 estimates a degree of freedom vector $[d_{tx}, d_{ty}, d_{tz}, d_{rx}, d_{ry}, d_{rz}]$ representing the degree of freedom of the movable portion. In the degree of freedom vector, $d_{tx}$ (represents the degree of freedom of translation in the x-axis direction, $d_{ty}$ represents the degree of freedom of translation in the y-axis direction, and $d_{tz}$ represents the degree of freedom of translation in the z-axis direction. In addition, in the degree of freedom vector, $d_{rx}$ represents the degree of freedom of rotation around the x axis, $d_{ry}$ represents the degree of freedom of rotation around the y axis, and $d_{rz}$ represents the degree of freedom of rotation around the z axis.

In the first embodiment, the estimating unit 24 estimates the degree of freedom of the movable portion based on the translation vector and the rotation vector obtained by the principal component analysis and a learned model generated in advance from learning data. The learning data is data representing a combination of a learning displacement vector $[t_x, t_y, t_z, r_x, r_y, r_z]$ and a learning degree of freedom vector $[d_{tx}, d_{ty}, d_{tz}, d_{rx}, d_{ry}, d_{rz}]$.

For example, when there is a specific displacement vector $[t_x, t_y, t_z, r_x, r_y, r_z]$ for the learning data, a degree of freedom vector corresponding to the specific displacement vector is expressed as $[d_{tx}, d_{ty}, d_{tz}, d_{rx}, d_{ry}, d_{rz}]$.

Figure 7:
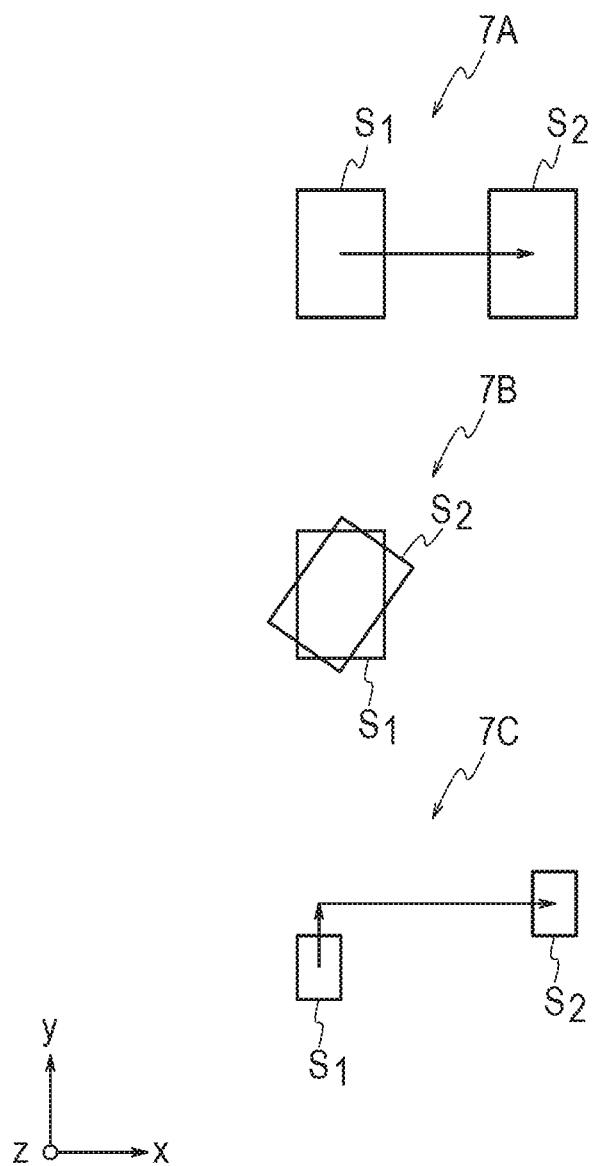
FIG. 7 is an explanatory view for explaining learning data.

FIG. 7 is an explanatory view for explaining the learning data. As illustrated in FIG. 7, for example, reference numeral 7A denotes a case that the three-dimensional information S1 obtained at the time t1 is changed to the three-dimensional information S2 at the time t2. At this time, a displacement vector obtained in the case 7A and a correct degree of freedom vector corresponding to the obtained displacement vector are set as learning data.

For example, in the case 7A, it is correct that there is a degree of freedom in the translation in the x-axis direction. In a case 7B, it is correct that there is a degree of freedom in the rotation in the z-axis direction. In a case 7C, it is correct that there is a degree of freedom in the translation in the x-axis direction and a degree of freedom in the translation in the y-axis direction.

These learning data are used to generate a learned model by machine learning. For example, a case where a model for estimating the degree of freedom vector $[d_{tx}, d_{ty}, d_{tz}, d_{rx}, d_{ry}, d_{rz}]$ from the displacement vector $[t_x, t_y, t_z, r_x, r_y, r_z]$ is expressed by the following expression (3) is considered.

$$\begin{bmatrix} d_{tx} \\ d_{ty} \\ d_{tz} \\ d_{rx} \\ d_{ry} \\ d_{rz} \end{bmatrix} = \begin{bmatrix} w_{11} & w_{12} & w_{13} & w_{14} & w_{15} & w_{16} \\ w_{21} & w_{22} & w_{23} & w_{24} & w_{25} & w_{26} \\ w_{31} & w_{32} & w_{33} & w_{34} & w_{35} & w_{36} \\ w_{41} & w_{42} & w_{43} & w_{44} & w_{45} & w_{46} \\ w_{51} & w_{52} & w_{53} & w_{54} & w_{55} & w_{56} \\ w_{61} & w_{62} & w_{63} & w_{64} & w_{65} & w_{66} \end{bmatrix} \begin{bmatrix} t_x \\ t_y \\ t_z \\ r_x \\ r_y \\ r_z \end{bmatrix} \quad (3)$$

When the model for estimating the degree of freedom vector from the displacement vector is expressed by the equation (3), parameters $w_{11}$ to $w_{66}$ included in the model are obtained by machine learning. By the machine learning, the parameters $w_{11}$ to $w_{66}$ in the model are determined according to the learning data to obtain a learned model.

The estimating unit 24 inputs the displacement vector including the translation vector and the rotation vector obtained by the principal component analysis to the learned model to estimate the degree of freedom vector $[d_{tx}, d_{ty}, d_{tz}, d_{rx}, d_{ry}, d_{rz}]$ of the movable portion.

The degree of freedom vector of the movable portion is output, for example, in a form as represented by the following expression (4). The expression (4) indicates that the translation in the x-axis direction and the rotation around the z axis are estimated as degrees of freedom.

$$\begin{bmatrix} d_{tx} \\ d_{ty} \\ d_{tz} \\ d_{rx} \\ d_{ry} \\ d_{rz} \end{bmatrix} = \begin{bmatrix} 1 \\ 0 \\ 0 \\ 0 \\ 0 \\ 1 \end{bmatrix} \quad (4)$$

Next, the estimating unit 24 estimates a movable range of the movable portion of the target object based on the rotation vector $[r_x, r_y, r_z]$ and the translation vector $[t_x, t_y, t_z]$ in the displacement vector.

For example, as illustrated in FIG. 6, the estimating unit 24 sets a position of each of the three-dimensional points $P_1$ to $P_8$ at the time t1 as a start point T'min in translation based on a change in each three-dimensional point between the three-dimensional information S1 at the time t1 and the three-dimensional information S2 at the time t2. Further, the estimating unit 24 sets a position of each of the three-dimensional points $Q_1$ to $Q_8$ of the three-dimensional information S2 at the time t2 as an end point T'max in translation. Then, the estimating unit 24 estimates T'min to T'max as a translational movable range of the movable portion of the target object.

Further, as illustrated in FIG. 6, the estimating unit 24 sets an angle of each of the three-dimensional points $P_1$ to $P_8$ at the time t1 as a start point R'min in rotation based on a change in each three-dimensional point between the three-dimensional information S1 at the time t1 and the three-dimensional information S2 at the time t2. Further, the estimating unit 24 sets an angle of each of the three-dimensional points $Q_1$ to $Q_8$ at the time t2 as an end point R'max in rotation. Then, the estimating unit 24 estimates R'min to R'max as a rotational movable range of the movable portion of the target object.

Figure 8:
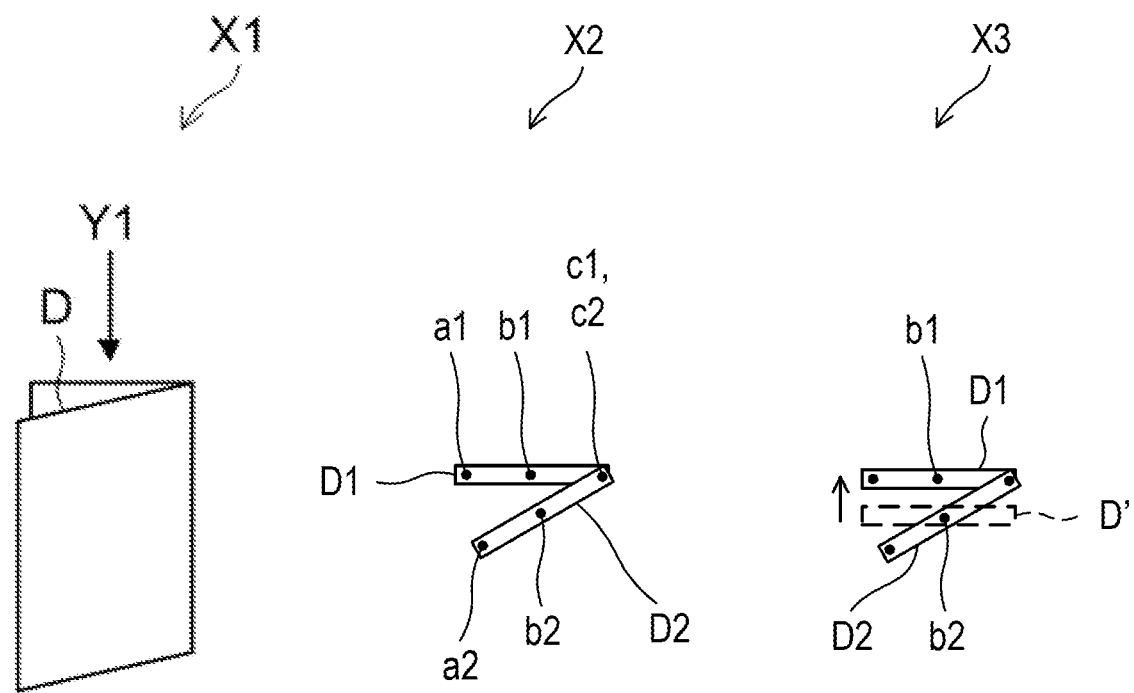
FIG. 8 is an explanatory view for explaining a relationship between three-dimensional points representing a movable portion.

When estimating the translational and rotational movable range of the movable portion of the target object, the relationship between the three-dimensional points representing the movable portion may be further taken into account. FIG. 8 is an explanatory view for explaining the relationship between the three-dimensional points representing the movable portion. In FIG. 8, reference numeral X1 denotes a door D as a movable portion. A view of the door D of FIG. 8 when viewed from the Y1 direction is denoted by reference numeral X2. When the door D is closed, the positions of representative three-dimensional points of the door D are a1, b1, and c1. Meanwhile, when the door D is opened, the positions of the respective three-dimensional points are a2, b2, and c2. In this case, for example, as denoted by reference numeral X3, focusing only on the point b2 without considering the relationship between the three-dimensional points, and assuming the rotation D' around the point b2 and the translation in the arrow direction, it coincides with a case D1 where the door D is closed. Therefore, when estimating a movable range, a rotation axis may be further required according to the translation amount of each three-dimensional point. In this case, the estimating unit 24 calculates, for example, the amount of translation to a1 to a2, the amount of translation to b1 to b2, and the amount of translation to c1 to c2, and specifies c1 to c2 having the smallest translation amount. Then, the estimating unit 24 estimates that the rotation axis exists at the point c1 (=c2) having the smallest amount of translation.

The three-dimensional model generating unit 25 reads the three-dimensional information of the target object stored in the information storing unit 18. Then, the three-dimensional model generating unit 25 generates a three-dimensional model representing the target object based on the three-dimensional information of the target object. For example, the three-dimensional model generating unit 25 sets the three-dimensional information acquired at a specific time as a three-dimensional model representing the target object.

The three-dimensional model generated by the three-dimensional model generating unit 25 is stored in the three-dimensional model storing unit 26. The three-dimensional model stored in the three-dimensional model storing unit 26 may be a three-dimensional model different from the three-dimensional model generated by the three-dimensional model generating unit 25. For example, the three-dimensional model stored in the three-dimensional model storing unit 26 may be a three-dimensional model generated in advance by 3Dimensional computer-aided design software.

Based on the movable degree of freedom vector of the movable portion estimated by the estimating unit 24 and the movable range of the movable portion, the assigning unit 28 assigns the degree of freedom information indicating the degree of freedom for movement and the movable range to the movable portion of the three-dimensional model stored in the three-dimensional model storing unit 26. In addition, when the rotation axis related to the movement of rotation is estimated by the estimating unit 24, the degree of freedom information including the position of the rotation axis is assigned to the movable portion.

For example, as illustrated in FIG. 3, the assigning unit 28 assigns the degree of freedom information F to the movable portion of the target object.

In a case where the degree of freedom information estimated up to the previous time has been assigned to the three-dimensional model stored in the three-dimensional model storing unit 26, the assigning unit 28 integrates the degree of freedom information up to the previous time and the current degree of freedom information, and assigns the integrated degree of freedom information to the three-dimensional model.

Figure 9:
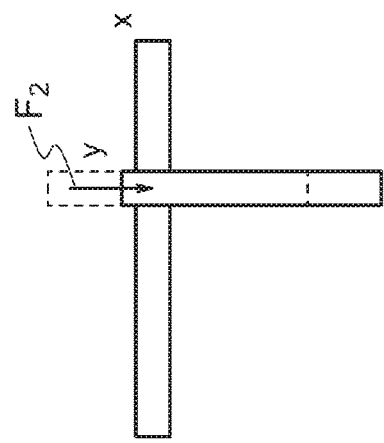
FIG. 9 is an explanatory view for explaining an integration of degree of freedom information.
Figure 9:
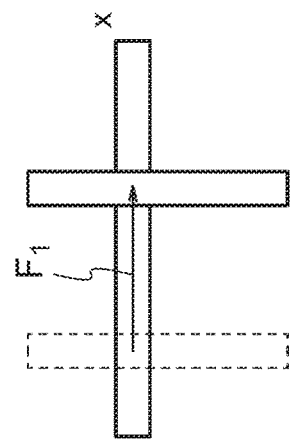
Figure 9:
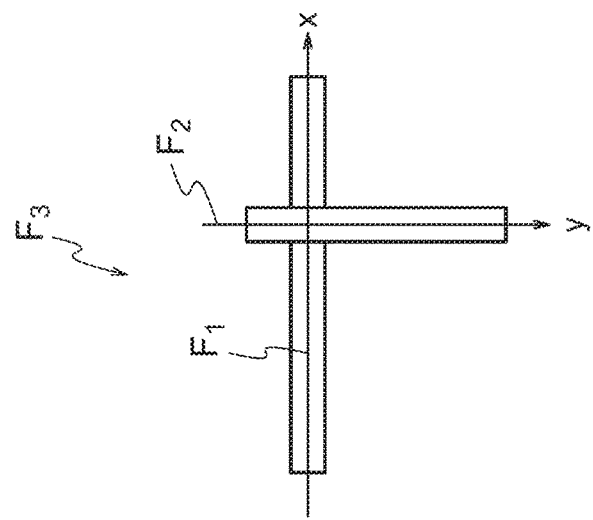

For example, as illustrated in FIG. 9, it is assumed that degree of freedom information F1 of translation in the x-axis direction is assigned as the degree of freedom information estimated up to the previous time. When degree of freedom information F2 of translation in the y-axis direction is estimated by the current processing, the assigning unit 28 integrates the degree of freedom information F1 and the degree of freedom information F2 as illustrated in FIG. 9, and assigns the integrated degree of freedom information F3 to the three-dimensional model.

It is also assumed that, for example, as the degree of freedom estimated up to the previous time, a degree of freedom vector represented in the following expression (5) is assigned to the movable portion.

$$\begin{bmatrix} d_{tx} \\ d_{ty} \\ d_{tz} \\ d_{rx} \\ d_{ry} \\ d_{rz} \end{bmatrix} = \begin{bmatrix} 1 \\ 0 \\ 0 \\ 0 \\ 0 \\ 0 \end{bmatrix} \quad (5)$$

It is also assumed that a degree of freedom vector represented in the following expression (6) is estimated by the current processing.

$$\begin{bmatrix} d'_{tx} \\ d'_{ty} \\ d'_{tz} \\ d'_{rx} \\ d'_{ry} \\ d'_{rz} \end{bmatrix} = \begin{bmatrix} 0 \\ 0 \\ 0 \\ 0 \\ 0 \\ 1 \end{bmatrix} \quad (6)$$

In this case, since the degree of freedom vector of the expression (6) above is different from the degree of freedom vector obtained by the processing up to the previous time, the assigning unit 28 adds the degree of freedom vector represented in the expression (6) to the degree of freedom vector obtained up to the previous time represented in the expression (5).

Further, when integrating the degree of freedom information up to the previous time and the current degree of freedom information, the assigning unit 28 integrates the movable range in the degree of freedom information according to a result of the comparison between the movable range assigned up to the previous time and the movable range obtained by the current processing.

Specifically, the assigning unit 28 compares an angle corresponding to the end point Rmax of the movable range of rotation up to the previous time with an angle corresponding to the end point R'max of the movable range of rotation obtained by the current processing. When the angle corresponding to the end point R'max is larger than the angle corresponding to the end point Rmax, the assigning unit 28 updates the angle corresponding to the end point Rmax to the angle corresponding to the end point R'max.

Further, the assigning unit 28 compares an angle corresponding to the start point Rmin of the movable range of rotation up to the previous time with an angle corresponding to the start point R'min of the movable range of rotation obtained by the current processing. Then, when the angle corresponding to the start point R'min is smaller than the angle corresponding to the start point Rmin, the assigning unit 28 updates the angle corresponding to the start point Rmin to the angle corresponding to the start point R'min.

Further, the assigning unit 28 compares a position corresponding to the end point Tmax of the movable range of translation up to the previous time with a position corresponding to the end point T'max of the movable range of translation obtained by the current processing. When the position corresponding to the end point T'max is larger than the position corresponding to the end point Tmax, the assigning unit 28 updates the position corresponding to the end point Tmax to the position corresponding to the end point T'max.

Further, the assigning unit 28 compares an angle corresponding to the start point Tmin of the movable range of translation up to the previous time with an angle corresponding to the start point T'min of the movable range of translation obtained by the current processing. When the angle corresponding to the starting point T'min is smaller than the angle corresponding to the start point Rmin, the assigning unit 28 updates the angle corresponding to the start point Tmin to the angle corresponding to the start point T'min.

When a signal is received from an input/output device (not illustrated), the output unit 29 reads out the three-dimensional model assigned with the degree of freedom information from the three-dimensional model storing unit 26, and outputs the three-dimensional model.

The three-dimensional model output by the output unit 29 is output to the output device 30. The output device 30 is implemented by, for example, a display.

Figure 10:
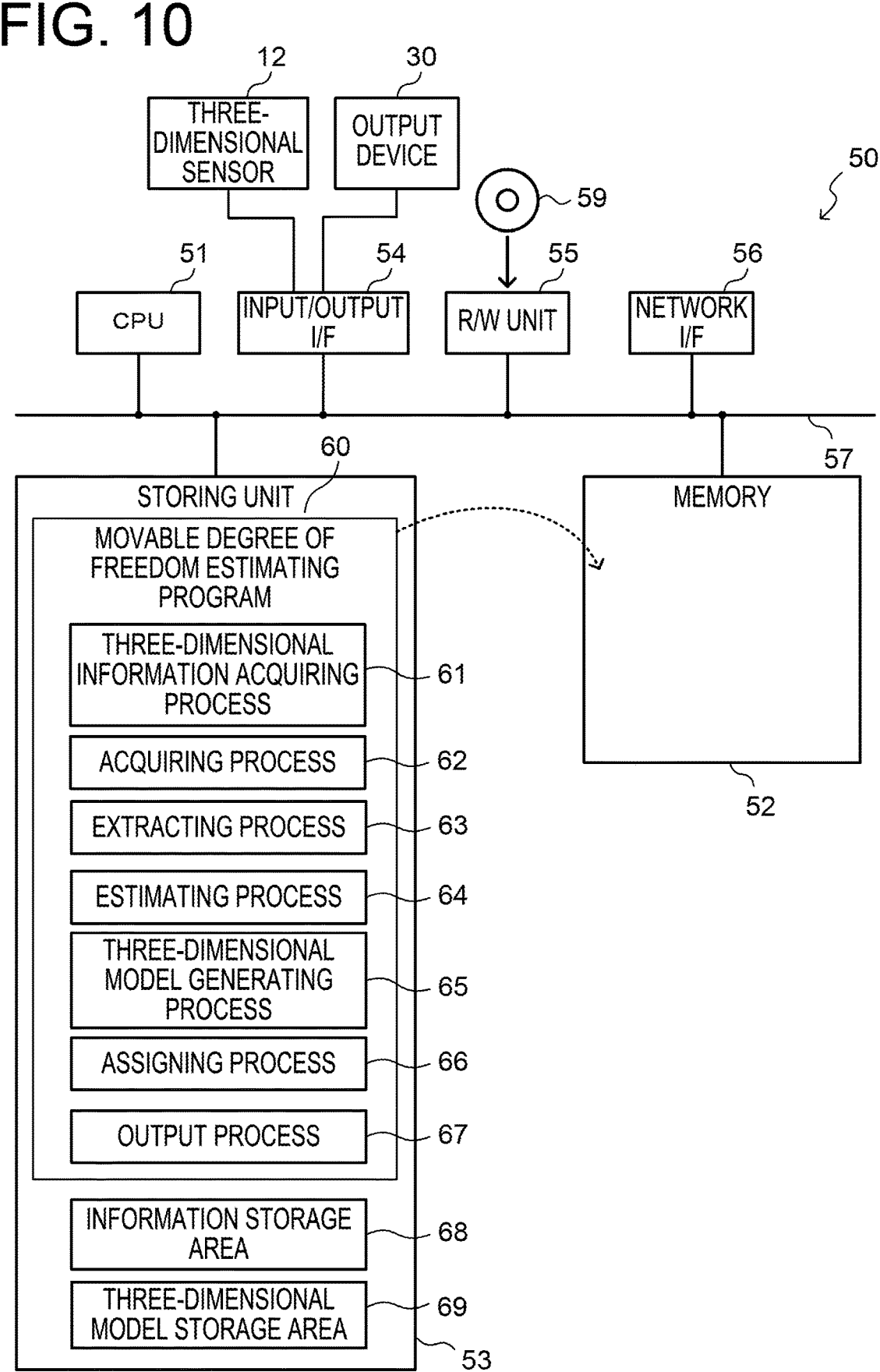
FIG. 10 is a block diagram illustrating a schematic configuration of a computer that functions as a movable degree of freedom estimating device according to a first embodiment.

The movable degree of freedom estimating device 14 may be implemented by, for example, a computer 50 illustrated in FIG. 10. The computer 50 includes a CPU 51, a memory 52 as a temporary storage area, and a nonvolatile storing unit 53. The computer 50 further includes a three-dimensional sensor 12, an input/output interface (I/F) 54 to which an input/output device such as the output device 30 is connected, and a read/write (R/W) unit 55 that controls read/write of data from/in a recording medium 59. The computer 50 further includes a network I/F 56 connected to a network such as the Internet. The CPU 51, the memory 52, the storing unit 53, the input/output I/F 54, the R/W unit 55, and the network I/F 56 are interconnected via a bus 57.

The storing unit 53 may be implemented by, for example, a hard disk drive (HDD), a solid state drive (SSD), or a flash memory. A movable degree of freedom estimating program 60 for causing the computer 50 to function as the movable degree of freedom estimating device 14 is stored in the storing unit 53 as a storage medium. The movable degree of freedom estimating program 60 has a three-dimensional information acquiring process 61, an acquiring process 62, an extracting process 63, an estimating process 64, a three-dimensional model generating process 65, an assigning process 66, and an output process 67. Information constituting the information storing unit 18 is stored in an information storage area 68. Information constituting the three-dimensional model storing unit 26 is stored in a three-dimensional model storage area 69.

The CPU 51 reads out the movable degree of freedom estimating program 60 from the storing unit 53, loads the movable degree of freedom estimating program 60 in the memory 52, and sequentially executes the processes of the movable degree of freedom estimating program 60. By executing the three-dimensional information acquiring process 61, the CPU 51 operates as the three-dimensional information acquiring unit 16 illustrated in FIG. 1. By executing the acquiring process 62, the CPU 51 operates as the acquiring unit 20 illustrated in FIG. 1. By executing the extracting process 63, the CPU 51 operates as the extracting unit 22 illustrated in FIG. 1. By executing the estimating process 64, the CPU 51 operates as the estimating unit 24 illustrated in FIG. 1. By executing the three-dimensional model generating process 65, the CPU 51 operates as the three-dimensional model generating unit 25 illustrated in FIG. 1. By executing the assigning process 66, the CPU 51 operates as the assigning unit 28 illustrated in FIG. 1. By executing the output process 67, the CPU 51 operates as the output unit 29 illustrated in FIG. 1. The CPU 51 reads out information from the information storage area 68 and loads the information storing unit 18 in the memory 52. Further, the CPU 51 reads out information from the three-dimensional model storage area 69 and loads the information storing unit 18 in the memory 52. As a result, the computer 50 that has executed the movable degree of freedom estimating program 60 functions as the movable degree of freedom estimating device 14. The CPU 51 that executes the movable degree of freedom estimation program 60, which is software, is hardware.

The function implemented by the movable degree of freedom estimating program 60 may also be implemented by, for example, a semiconductor integrated circuit, more specifically, an application specific integrated circuit (ASIC).

Figure 11:
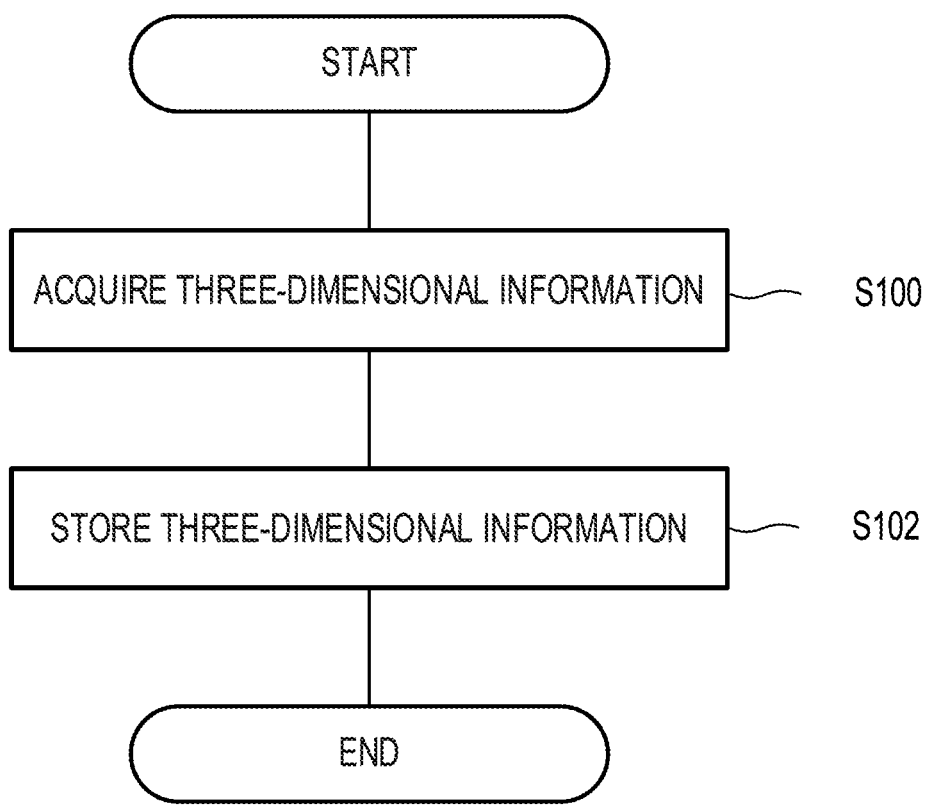
FIG. 11 is a flowchart illustrating an example of an information acquisition processing routine according to the embodiment.

Next, the operation of the movable degree of freedom estimating device 14 according to the first embodiment will be described. When the three-dimensional information of the target object starts to be acquired by the three-dimensional sensor 12, the movable degree of freedom estimating device 14 executes an information acquisition processing routine illustrated in FIG. 11. The information acquisition processing routine illustrated in FIG. 11 is repeatedly executed to acquire three-dimensional information of each time of the target object.

In operation S100, the three-dimensional information acquiring unit 16 acquires the three-dimensional information acquired by the three-dimensional sensor 12.

In operation S102, the three-dimensional information acquiring unit 16 stores the three-dimensional information acquired in operation S100 and the time information in association with each other in the information storing unit 18.

Figure 12:
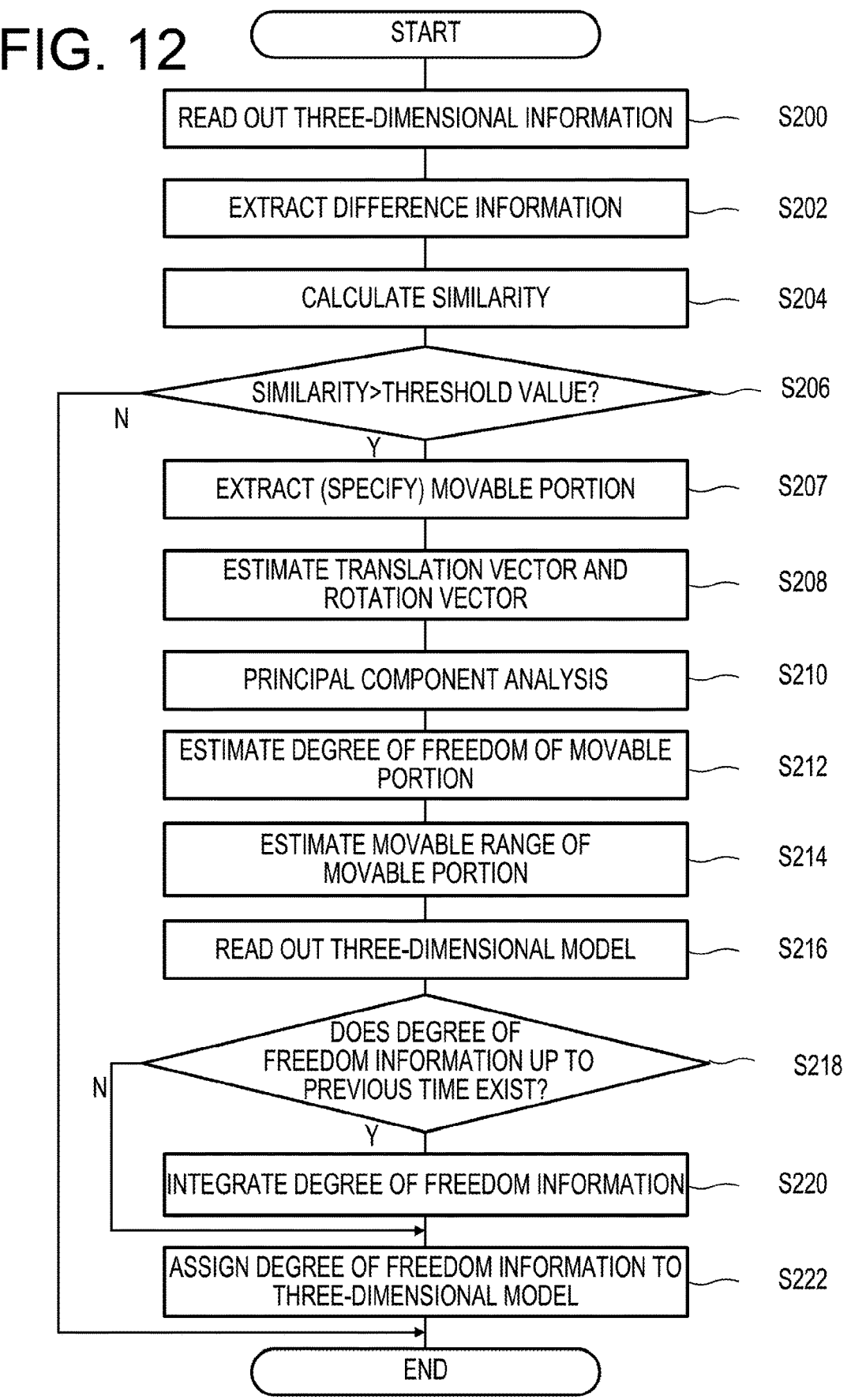
FIG. 12 is a flowchart illustrating an example of a movable degree of freedom estimation processing routine according to the embodiment.

When the three-dimensional information of each time of the target object is stored in the information storing unit 18, the three-dimensional model generating unit 25 of the movable degree of freedom estimating device 14 generates a three-dimensional model representing the target object based on the three-dimensional information of the target object stored in the information storing unit 18, and stores the three-dimensional model in the three-dimensional model storing unit 26. Then, the movable degree of freedom estimating device 14 executes a movable degree of freedom estimation processing routine illustrated in FIG. 12.

In operation S200, the acquiring unit 20 acquires first information which is three-dimensional information of the target object at a specific time t1, and second information which is three-dimensional information of the target object at a time t2 different from the specific time, from the information storing unit 18.

In operation S202, the extracting unit 22 extracts difference information S between the first information TD1 and the second information TD2 acquired in operation S200, based on the first information TD1 and the second information TD2.

In operation S204, the extracting unit 22 calculates the similarity between the three-dimensional information at the time t1 in the difference information extracted in operation S202 and the three-dimensional information at the time t2 in the difference information.

In operation S206, the extracting unit 22 determines whether or not the similarity calculated in operation S204 is larger than a preset threshold value. When it is determined that the similarity calculated in operation S204 is larger than the threshold value, the routine proceeds to operation S207. Meanwhile, when it is determined that the similarity calculated in operation S204 is equal to or smaller than the threshold value, the movable degree of freedom estimation processing routine is ended.

In operation S207, the extracting unit 22 extracts (specifies) the three-dimensional information S1 at the time t1 in the difference information S and the three-dimensional information S2 at the time t2 in the difference information S as a movable portion of the target object.

In operation S208, the estimating unit 24 calculates a homogeneous transformation matrix of each three-dimensional point based on a change in each three-dimensional point between the three-dimensional information S1 at the time t1 in the difference information S and the three-dimensional information S2 at the time t2 in the difference information S. Further, the estimating unit 24 estimates a translation vector and a rotation vector of each three-dimensional point based on the homogeneous transformation matrix of each three-dimensional point.

In operation S210, the estimating unit 24 performs principal component analysis on the rotation vectors of the plural three-dimensional points estimated in operation S208 to acquire a rotation vector subjected to the principal component analysis. In addition, the estimating unit 24 performs principal component analysis on the translation vectors of the plural three-dimensional points estimated in operation S208 to acquire a translation vector subjected to the principal component analysis.

In operation S212, the estimating unit 24 estimates a degree of freedom vector of the movable portion by inputting the translation vector and the rotation vector obtained in operation S210 to a learned model.

In operation S214, the estimating unit 24 estimates a movable range of the movable portion of the target object based on the rotation vector and the translation vector in a displacement vector of each three-dimensional point. For example, for each three-dimensional point included in the three-dimensional information, the estimating unit 24 estimates the position and angle of the three-dimensional point at the time t1 in the difference information and the position and angle of the three-dimensional point at the time t2 in the difference information, as a movable range.

In operation S216, the assigning unit 28 reads out the three-dimensional model stored in the three-dimensional model storing unit 26.

In operation S218, the assigning unit 28 determines whether or not the degree of freedom information estimated up to the previous processing is assigned to the three-dimensional model read out in operation S216. When it is determined that the degree of freedom information estimated up to the previous processing is assigned to the three-dimensional model, the routine proceeds to operation S220. Meanwhile, when the degree of freedom information estimated up to the previous processing is not assigned to the three-dimensional model, the routine proceeds to operation S222.

In operation S220, the assigning unit 28 integrates the degree of freedom information up to the previous time and the current degree of freedom information including the degree of freedom estimated in operation S212 and the movable range estimated in operation S214.

In operation S222, the assigning unit 28 assigns the current degree of freedom information including the degree of freedom estimated in operation S212 and the movable range estimated in operation S214 or the degree of freedom information integrated in operation S220, to the three-dimensional model. Then, the assigning unit 28 stores the three-dimensional model in the three-dimensional model storing unit 26, and ends the movable degree of freedom estimation processing routine.

As described above, the movable degree of freedom estimating device 14 according to the first embodiment extracts (specifies) the movable portion of the target object based on the difference information indicating a difference between the three-dimensional information of the target object at a specific time and the three-dimensional information of the target object at a time different from the specific time. Then, the movable degree of freedom estimating device 14 estimates the movable degree of freedom of the movable portion included in the target object according to the displacement of the movable portion. Then, based on the movable degree of freedom of the movable portion, the movable degree of freedom estimating device 14 assigns the degree of freedom information indicating the movable degree of freedom to the movable portion of the three-dimensional model representing the target object. Thus, it is possible to acquire information on the degree of freedom of the movable portion of the target object.

Thus, for example, the degree of freedom information may be assigned to the three-dimensional model without manually adding the degree of freedom information to the three-dimensional model.

In addition, the degree of freedom of the movable portion is estimated according to the rotation vector and the translation vector obtained from the difference information and a learned model generated in advance from learning data. Thus, using the learned model generated from the learning data in which the learning rotation vector, the learning translation vector, and the learning degree of freedom vector are associated with each other, the degree of freedom of the movable portion of the target object may be appropriately estimated.

Further, it is possible to immediately model a target object existing in a physical space and to assign the degree of freedom information.

Further, it is also possible to operate and display the three-dimensional model according to the degree of freedom information assigned to the three-dimensional model. By operating and displaying the three-dimensional model, for example, an instruction may be easily communicated from a remote place to a worker at the site.

Figure 13:
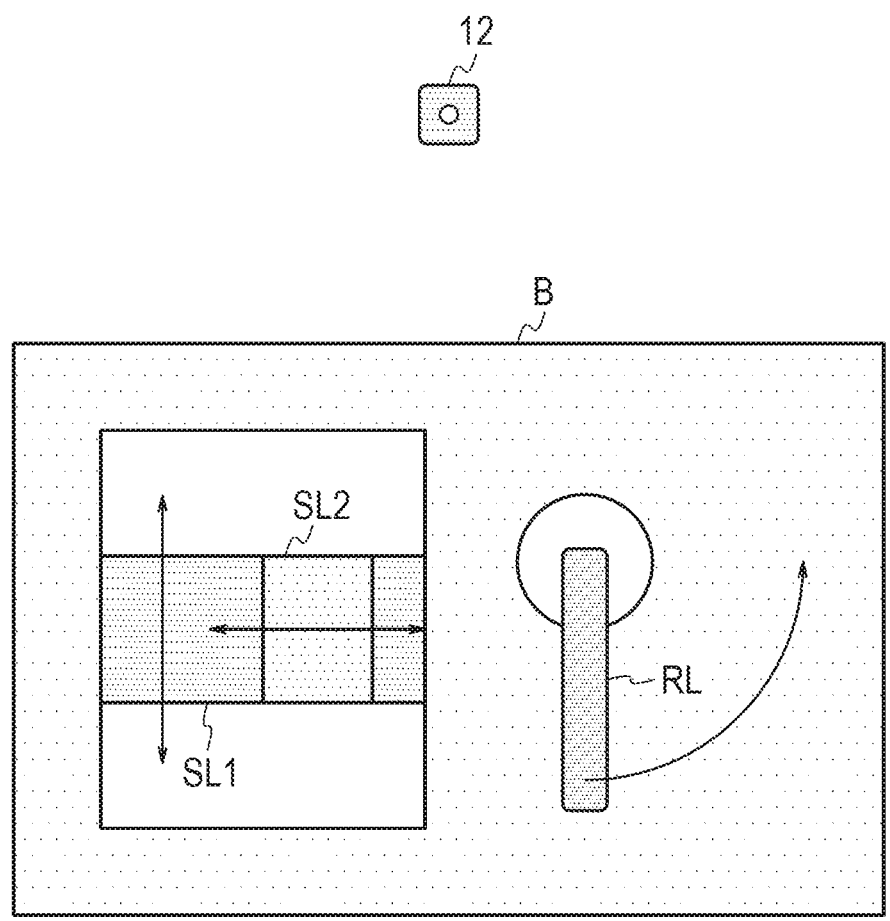
FIG. 13 is an explanatory view for explaining an embodiment in a case where a target object is a predetermined operation panel.

For example, an embodiment in a case where the target object is a predetermined operation panel will be described. FIG. 13 illustrates an example of a three-dimensional model of an operation panel. In order to instruct how to use and operate the operation panel from a remote place to the site, it is necessary to model the operation panel such that, for example, a lever which is a movable portion of the operation panel is movable. An operation panel B illustrated in FIG. 13 includes a first sliding type lever SL1, a second sliding type lever SL2, and a rotary type lever RL.

When the measurement by the three-dimensional sensor 12 is started, three-dimensional information of the operation board B which is the target object is sequentially acquired. First, at the time t1, three-dimensional information is acquired in a state in which the first sliding type lever SL1, the second sliding type lever SL2, and the rotary type lever RL are not moved.

Next, at the time t2, three-dimensional information is acquired in a state in which the rotary type lever RL is moved. In this case, the rotary type lever RL is extracted as a movable portion, and a rotation vector is estimated according to displacement of each three-dimensional point corresponding to the rotary type lever RL. Then, degree of freedom information corresponding to the rotation vector is assigned to the rotary type lever RL which is the movable portion.

Next, at the time t3, three-dimensional information is acquired in a state in which the second sliding type lever SL2 is moved. In this case, the second sliding type lever SL2 is extracted as a movable portion, and a translation vector is estimated according to displacement of each three-dimensional point corresponding to the second sliding type lever SL2. Then, degree of freedom information corresponding to the translation vector is assigned to the second sliding type lever SL2 which is the movable portion. One horizontal degree of freedom is assigned as the degree of freedom information of the second sliding type lever SL2.

Next, at the time t4, three-dimensional information is acquired in a state in which the first sliding type lever SL1 is moved. In this case, the first sliding type lever SL1 is extracted as a movable portion, and a translation vector is estimated according to displacement of each three-dimensional point corresponding to the first sliding type lever SL1. Then, degree of freedom information corresponding to the translation vector is assigned to the first sliding type lever SL1 which is the movable portion. One vertical degree of freedom is assigned as the degree of freedom information of the first sliding type lever SL1.

Next, at the time t5, three-dimensional information is acquired in a state in which the rotary type lever RL is further moved from the time t2. In this case, degree of freedom information with an updated rotation range is assigned to the rotary type lever RL which is the movable portion.

Second Embodiment

Next, a second embodiment will be described. The second embodiment is different from the first embodiment in terms of a method of estimating the degree of freedom of the movable portion. Specifically, in the second embodiment, the degree of freedom of the movable portion is estimated according to the value of each element in the rotation vector and the value of each element in the translation vector obtained from the difference information. Since a movable degree of freedom estimating system according to the second embodiment has the same configuration as that of the first embodiment, elements of the configuration will be denoted by the same reference numerals, and description thereof will be omitted.

The estimating unit 24 of the second embodiment estimates the degree of freedom of the movable portion according to the value of each element of the rotation vector and the value of each element of the translation vector obtained from the difference information.

For example, the estimating unit 24 estimates an axis corresponding to the maximum value of each element of the rotation vector and the maximum value of each element of the translation vector obtained from the difference information as the degree of freedom of the movable portion.

A case where a displacement vector including the rotation vector and the translation vector is expressed by the following expression (7) will be described as an example.

$$\begin{bmatrix} t_x \\ t_y \\ t_z \\ r_x \\ r_y \\ r_z \end{bmatrix} = \begin{bmatrix} 0.85 \\ 0.03 \\ 0.11 \\ 0.20 \\ 0.08 \\ 0.66 \end{bmatrix} \quad (7)$$

In the displacement vector of the expression (7) above, the value of an element $t_x$ representing the translation in the x-axis direction is the largest. Therefore, the estimating unit 24 of the second embodiment estimates that there is a degree of freedom in the translation in the x-axis direction, as represented in the following expression (8).

$$\begin{bmatrix} d_{tx} \\ d_{ty} \\ d_{tz} \\ d_{rx} \\ d_{ry} \\ d_{rz} \end{bmatrix} = \begin{bmatrix} 1 \\ 0 \\ 0 \\ 0 \\ 0 \\ 0 \end{bmatrix} \quad (8)$$

Alternatively, the estimating unit 24 estimates an axis having a value larger than a threshold value according to the value of each element in the rotation vector and the value of each element of the translation vector obtained from the difference information as the degree of freedom of the movable portion.

For example, when the threshold value is 0.6, the value of an element $t_x$ representing the translation in the x-axis direction and the value of an element rz representing the rotation about the z axis are larger than the threshold value in the displacement vector of the expression (7) above. Therefore, the estimating unit 24 of the second embodiment estimates that there is a degree of freedom in the translation in the x-axis direction and the rotation around the z axis as shown in the following expression (9).

$$\begin{bmatrix} d_{tx} \\ d_{ty} \\ d_{tz} \\ d_{rx} \\ d_{ry} \\ d_{rz} \end{bmatrix} = \begin{bmatrix} 1 \\ 0 \\ 0 \\ 0 \\ 0 \\ 1 \end{bmatrix} \quad (9)$$

Since other configurations and operations of the movable degree of freedom estimating system according to the second embodiment are similar to those of the first embodiment, description thereof will be omitted.

As described above, the movable degree of freedom estimating device 14 according to the second embodiment estimates the degree of freedom of the movable portion based on the value of each element of the rotation vector and the value of each element of the translation vector obtained from the difference information. Thus, it is possible to easily estimate the degree of freedom of the movable portion of the target object.

Although the mode in which each program is stored (installed) in advance in the storing unit has been described, the present disclosure is not limited thereto. The program related to the disclosed technique may be provided in a form recorded on a recording medium such as a CD-ROM, a DVD-ROM, or a USB memory.

All literatures, patent applications, and technical standards described in this specification are incorporated herein by reference to the same extent as if the individual literatures, patent applications, and technical standards were specifically and individually are incorporated by reference and are written.

Next, a modification of each embodiment will be described.

Although a case where the degree of freedom information is estimated after the three-dimensional information of each time acquired by the three-dimensional sensor 12 is stored in the information storing unit 18 has been described in each embodiment as an example, the present disclosure is not limited thereto. For example, each time the three-dimensional information is acquired by the three-dimensional sensor 12, the degree of freedom information may be estimated and assigned to the three-dimensional model. In this case, the degree of freedom information may be estimated and assigned to the three-dimensional model only when the difference information is extracted by the extracting unit 2.

Although a case where the model represented in the expression (3) is used as a model for estimating a degree of freedom vector from a displacement vector has been described in the first embodiment as an example, the present disclosure is not limited thereto. For example, a model such as support vector machine (SVM) may be used to estimate the degree of freedom vector from the displacement vector.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A device for estimating a degree of freedom for movement, the device comprising:
   a memory; and
   a processor coupled to the memory and the processor configured to:
      acquire first three-dimensional information of a target object at a first time and second three-dimensional information of the target object at a second time;
      specify a movable portion of the target object according to a difference between the first three-dimensional information and the second three-dimensional information;
      estimate the degree of freedom for movement of the movable portion included in the target object according to displacement of the movable portion between the first three-dimensional information and the second three-dimensional information; and
      assign degree of freedom information for indicating the degree of freedom for movement to a three-dimensional model for representing the target object, based on the estimated degree of freedom for movement of the movable portion.

2. The device according to claim 1, wherein the processor is further configured to:
   read out the three-dimensional model from the memory in which the three-dimensional model assigned with the degree of freedom information up to a previous time is stored,
   integrate the degree of freedom information up to the previous time and the degree of freedom information of a current time, and
   assign the integrated degree of freedom information to the three-dimensional model.

3. The device according to claim 1, wherein the degree of freedom information includes the degree of freedom for movement and a movable range of the movable portion.

4. The device according to claim 1, wherein the processor is further configured to estimate the degree of freedom for movement of the movable portion according to at least one of an amount of rotation of the movable portion and an amount of translation of the movable portion.

5. The device according to claim 1, wherein the processor is further configured to:
   calculate a similarity between the first three-dimensional information and the second three-dimensional information, and
   specify the first three-dimensional information and the second three-dimensional information as the movable portion when the similarity is equal to or larger than a threshold value.

6. The device according to claim 1, wherein the processor is further configured to:
   calculate a homogeneous transformation matrix of each three-dimensional point based on a change in each three-dimensional point between the first three-dimensional information and the second three-dimensional information;
   calculate a displacement vector that represents the displacement of the movable portion from each element of the homogeneous transformation matrix;
   perform principal component analysis on rotation vectors and translation vectors included in the displacement vector of a plurality of three-dimensional points; and
   estimate the degree of freedom for movement of the movable portion included in the target object according to rotation vectors and translation vectors obtained by the principal component analysis.

7. The device according to claim 6, wherein the processor is further configured to:
   estimate the degree of freedom for movement of the movable portion included in the target object by inputting the displacement vector including the rotation vectors and the translation vectors obtained by the principal component analysis to a learned model generated in advance from learning data, the learning data being data that represents a combination of a learning displacement vector and a learning degree of freedom vector.

8. The device according to claim 6, wherein the processor is further configured to:
   estimate a movable range of the movable portion based on the rotation vectors and the translation vectors in the displacement vector.

9. A computer-readable non-transitory recording medium storing a program that causes a computer to execute a procedure, the procedure comprising:
   acquiring first three-dimensional information of a target object at a first time and second three-dimensional information of the target object at a second time;
   specifying a movable portion of the target object according to a difference between the first three-dimensional information and the second three-dimensional information;
   estimating the degree of freedom for movement of the movable portion included in the target object according to displacement of the movable portion between the first three-dimensional information and the second three-dimensional information; and
   assigning degree of freedom information for indicating the degree of freedom for movement to a three-dimensional model for representing the target object, based on the estimated degree of freedom for movement of the movable portion.

10. The computer-readable non-transitory recording medium according to claim 9, wherein the procedure further includes:

reading out the three-dimensional model from the memory in which the three-dimensional model assigned with the degree of freedom information up to a previous time is stored, integrating the degree of freedom information up to the previous time and the degree of freedom information of a current time, and assigning the integrated degree of freedom information to the three-dimensional model.

11. The computer-readable non-transitory recording medium according to claim 9, wherein the degree of freedom information includes the degree of freedom for movement and a movable range of the movable portion.

12. The computer-readable non-transitory recording medium according to claim 9, wherein the procedure further includes estimating the degree of freedom for movement of the movable portion according to at least one of an amount of rotation of the movable portion and an amount of translation of the movable portion.

13. The computer-readable non-transitory recording medium according to claim 9, wherein the procedure further includes:

calculating a similarity between the first three-dimensional information and the second three-dimensional information, and specifying the first three-dimensional information and the second three-dimensional information as the movable portion when the similarity is equal to or larger than a threshold value.

14. A method for estimating a degree of freedom for movement, the method comprising:

acquiring first three-dimensional information of a target object at a first time and second three-dimensional information of the target object at a second time;

specifying a movable portion of the target object according to a difference between the first three-dimensional information and the second three-dimensional information;

estimating the degree of freedom for movement of the movable portion included in the target object according to displacement of the movable portion between the first three-dimensional information and the second three-dimensional information; and assigning degree of freedom information for indicating the degree of freedom for movement to a three-dimensional model for representing the target object, based on the estimated degree of freedom for movement of the movable portion, by a processor.

15. The method according to claim 14, wherein the processor further includes:

reading out the three-dimensional model from the memory in which the three-dimensional model assigned with the degree of freedom information up to a previous time is stored, integrating the degree of freedom information up to the previous time and the degree of freedom information of a current time, and assigning the integrated degree of freedom information to the three-dimensional model.

16. The method according to claim 14, wherein the degree of freedom information includes the degree of freedom for movement and a movable range of the movable portion.

17. The method according to claim 14, wherein the processor further includes estimating the degree of freedom for movement of the movable portion according to at least one of an amount of rotation of the movable portion and an amount of translation of the movable portion.

18. The method according to claim 14, wherein the processor further includes:

calculating a similarity between the first three-dimensional information and the second three-dimensional information, and specifying the first three-dimensional information and the second three-dimensional information as the movable portion when the similarity is equal to or larger than a threshold value.

\* \* \* \* \*